United States Patent
Pfeffer et al.

(10) Patent No.: US 11,701,726 B2
(45) Date of Patent: Jul. 18, 2023

(54) MATERIAL DEPOSITION FOR FLUID INJECTORS

(71) Applicant: Delavan Inc., West Des Moines, IA (US)

(72) Inventors: Brett A. Pfeffer, Granger, IA (US); Jason Ryon, Carlisle, IA (US); Pete J. Schnoebelen, West Des Moines, IA (US)

(73) Assignee: Collins Engine Nozzles, Inc., Des Moines, IA (US)

( * ) Notice: Subject to any disclaimer, the term of this patent is extended or adjusted under 35 U.S.C. 154(b) by 0 days.

(21) Appl. No.: 17/494,544

(22) Filed: Oct. 5, 2021

(65) Prior Publication Data

US 2023/0105416 A1 Apr. 6, 2023

(51) Int. Cl.
| | |
|---|---|
| *B23K 1/00* | (2006.01) |
| *B23K 26/342* | (2014.01) |
| *F02M 61/16* | (2006.01) |
| *B23K 101/00* | (2006.01) |
| *B23K 26/00* | (2014.01) |

(Continued)

(52) U.S. Cl.
CPC .......... *B23K 1/0018* (2013.01); *B23K 26/342* (2015.10); *F02M 51/06* (2013.01); *F02M 61/168* (2013.01); *B23K 26/0093* (2013.01); *B23K 2101/001* (2018.08); *B23P 2700/13* (2013.01); *F02M 2200/80* (2013.01); *F02M 2200/8069* (2013.01); *F02M 2200/8084* (2013.01); *F23D 2900/11101* (2013.01); *F23R 3/32* (2013.01)

(58) Field of Classification Search
CPC ............ F02M 61/168; F02M 2200/80; F02M 2200/8069; F02M 2200/8084; B23K 1/0018; B23K 26/0093; B23K 26/342; B23K 2101/001; B23P 2700/13; F23R 3/28; F23R 3/286; F23R 3/30; F23R 3/32; F23D 2900/11101
See application file for complete search history.

(56) References Cited

U.S. PATENT DOCUMENTS

| | | | |
|---|---|---|---|
| 2002/0134084 A1* | 9/2002 | Mansour | F23R 3/28 60/740 |
| 2007/0163263 A1 | 7/2007 | Thomson | |
| 2009/0100837 A1 | 4/2009 | Von Der Bank | |

(Continued)

FOREIGN PATENT DOCUMENTS

CN 112663051 A 4/2021

OTHER PUBLICATIONS

Partial European Search Report dated Feb. 16, 2023, issued during the prosecution of European Patent Application No. EP 22199618.4.

*Primary Examiner* — Matthew P Travers
(74) *Attorney, Agent, or Firm* — Locke Lord LLP; Joshua L. Jones; Scott D. Wofsy (57) ABSTRACT

A method of making a fluid injector for a gas turbine engine includes depositing material onto a piece of tube stock. The method includes machining the deposited material into a fluid injector component. Depositing can include laser cladding the material onto the piece of tube stock. The method can include placing or flowing braze into a braze joint location between the deposited material and another fluid injector component and forming the braze into a braze joint in the braze joint location.

2 Claims, 7 Drawing Sheets

(51) Int. Cl.
  *F02M 51/06*   (2006.01)
  *F23R 3/32*    (2006.01)

(56) References Cited

U.S. PATENT DOCUMENTS

| | | | |
|---|---|---|---|
| 2013/0227951 A1* | 9/2013 | Krichever | F02C 7/22 |
| | | | 29/889.22 |
| 2013/0298403 A1* | 11/2013 | Thomson | B23K 26/32 |
| | | | 29/890.09 |
| 2015/0052899 A1 | 2/2015 | Toon | |
| 2015/0053793 A1 | 2/2015 | Bellino et al. | |
| 2016/0325369 A1 | 11/2016 | Prociw et al. | |
| 2016/0361766 A1* | 12/2016 | Berglund | B22F 7/008 |
| 2021/0172341 A1 | 6/2021 | Fryer | |

\* cited by examiner

MATERIAL DEPOSITION FOR FLUID INJECTORS

BACKGROUND

1. Field

The present disclosure relates to fluid injectors, and more particularly to fluid injectors for gas turbine engines.

2. Description of Related Art

In pure air-blast fuel injectors, the fuel circuit must be attached to the fuel tube. In order to have a suitable braze length, the fuel prefilmer component must often be made from a large single piece of material and then a large percentage of the material must be removed through machining.

The fuel circuit in an air-blast injector requires a good surface for the liquid to film across. In many applications, this surface extends conically inwards along the interior of a prefilmer. In the usual method of manufacturing prefilmers, a piece of bar stock is often turned down to form this final surface.

Similarly, the fuel distributer requires features like spin slots which are usually machined into this component. There are often braze joint surfaces which connect to the prefilmer component or other components. In the usual method of manufacturing fuel distributers, a piece of bar stock is often turned down to a final surface.

In pure air-blast fuel injectors and pressure atomizer fuel injectors, there are often integral outer air swirlers. These components often require a slender, tube-like portion which acts as a heat shield along the fuel distributer, but also larger diameter material for the air swirler component. The outer air swirler is often made from a large piece of material stock and turned down to its final shape.

These conventional techniques have been considered satisfactory for their intended purpose. However, they also produce a considerable amount of waste material from the machining processes, and the machining time is considerable. There is an ever present need for improved fuel injector components and methods of making the same. This disclosure provides a solution for this need.

SUMMARY

A method of making a fluid injector for a gas turbine engine includes depositing material onto a piece of tube stock. The method includes machining the deposited material into a fluid injector component.

Depositing can include laser cladding, electron beam cladding, cold spaying, and/or plasma spraying the material onto the piece of tube stock. The piece of tube stock can be a prefilmer. Depositing material can include depositing material on only a portion of a circumference of an outer surface of the piece of tube stock. Machining can include forming a joint surface into the deposited material. The method can include forming a passage through the deposited material and through the piece of tube stock to form a passage through the added material and into an interior of the piece of tube stock. The method can include placing or flowing braze into a braze joint location between the deposited material and a fluid injector feed arm and forming the braze into a braze joint in the braze joint location to join the feed arm to the prefilmer.

Depositing material can include depositing material on an axial end of the piece of tube stock around a full circumference of the axial end. Machining can include forming a prefilming surface on an inside portion of the deposited material. Machining can include forming the deposited material into a frustoconical surface that converges in a direction away from the piece of tube stock material.

Depositing material can include depositing material about a full circumference of an outer surface of the piece of tube stock at one axial end of the piece of tube stock. Machining can include forming the deposited material into an outer air swirler. Machining can include forming air passages through the deposited material. Machining can include forming an outer air cap outboard of air passages in the deposited material. Machining can include forming a braze surface in the deposited material and brazing an outer air cap and/or fluid distributor to the braze surface.

The piece of tube stock can be a fluid distributor. Depositing material can include depositing a raised feature extending fully circumferentially around the piece of tube stock. Machining can include forming fluid slots in the raised feature. Machining can include forming a braze joint surface on an outward facing aspect of the raised feature. The method can include placing or flowing braze into a braze joint location between the braze joint surface and an inner surface of a prefilmer and forming the braze into a braze joint in the braze joint location to join the fluid distributor to the prefilmer.

A fluid injector includes a first fluid injector component, a second fluid injector component, and a metallurgical joint joining the first fluid injector component to the second fluid injector component. The metallurgical joint includes a metallurgical crystal structure having a first crystal structure boundary between the first fluid injector component and a deposited material, a second crystal structure boundary between the deposited material and a braze material, and a third crystal structure boundary between the braze material and the second fluid injector component.

The first fluid injector component can include a prefilmer and the second fluid injector component includes a feed arm. The first fluid injector component can include a fluid distributor and the second fluid injector component includes a prefilmer. The first fluid injector component can include a prefilmer and the second fluid injector component includes an outer air cap.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
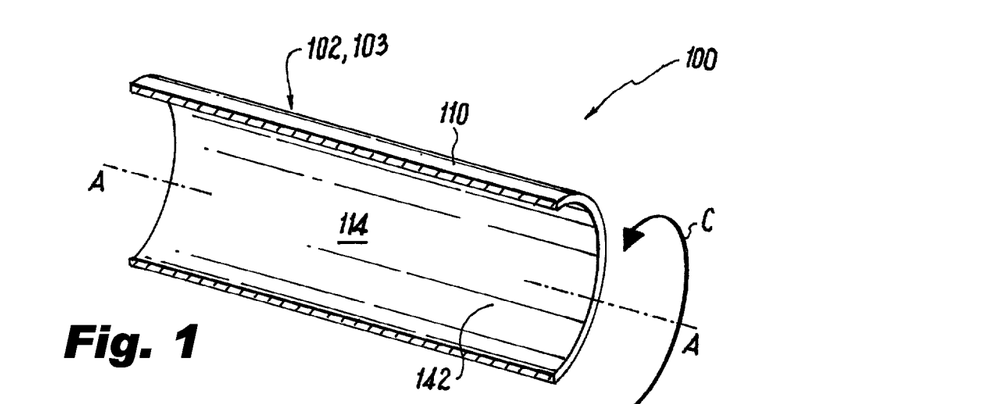
FIGS. 1-4 are schematic cross-sectional perspective views of respective stages in a process in accordance with the present disclosure, showing deposition and machining of a structure for joining a prefilmer to a feed arm in a fluid injector.

Reference will now be made to the drawings wherein like reference numerals identify similar structural features or aspects of the subject disclosure. For purposes of explanation and illustration, and not limitation, a partial view of an embodiment of a fluid injector in accordance with the disclosure is shown in FIG. 1 and is designated generally by reference character 100. Other embodiments of systems in accordance with the disclosure, or aspects thereof, are provided in FIGS. 2-16, as will be described. The systems and methods described herein can be used to construct fluid injectors such as used in gas turbine engines.

Figure 2:
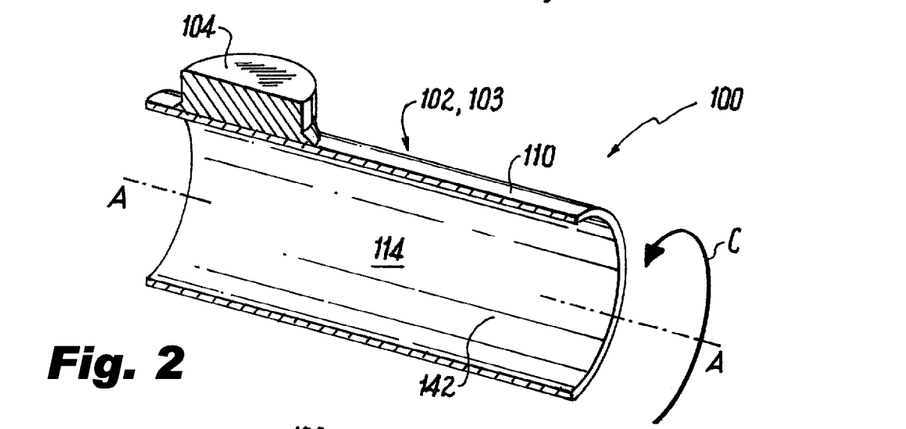
Figure 3:
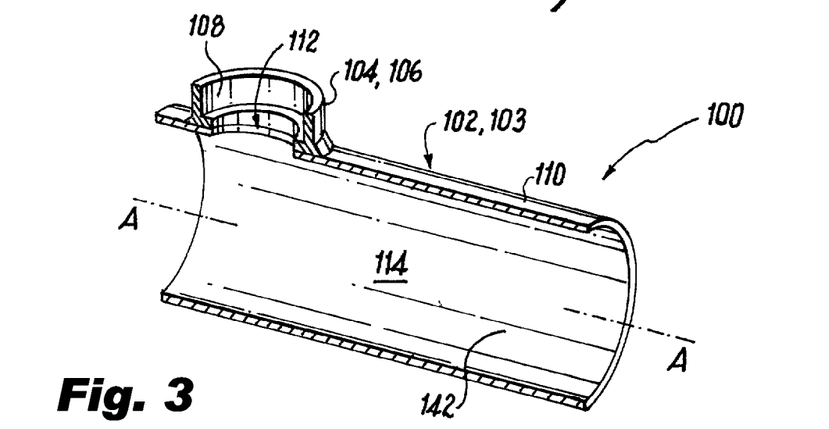

A method of making a fluid injector 100 includes starting with a piece of tube stock 102 as shown in FIG. 1, then depositing material 104 onto a piece of tube stock 102, as shown in FIG. 2. The material 104 can be deposited using laser cladding, which in the case of FIGS. 1-3 only includes depositing the material 104 on a portion of the circumference C of the outer surface 110 of the piece of tube stock 102. While laser cladding is discussed herein, those skilled in the art will readily appreciate that any other suitable deposition process can be used such as (but not limited to) electron beam cladding, cold spaying, or plasma spraying. The method includes machining the deposited material 104 into a fluid injector component 106, as shown in FIG. 3. In the case of FIGS. 1-3, the piece of tube stock 102 is a prefilmer 103, and the injector component 106 includes a joint surface 108, which is machined into the material 104. As shown in FIG. 3, a passage 112 is formed, e.g. by machining, through the deposited material 104 and through the piece of tube stock 102 into an interior 114 of the piece of tube stock 102.

Figure 4:
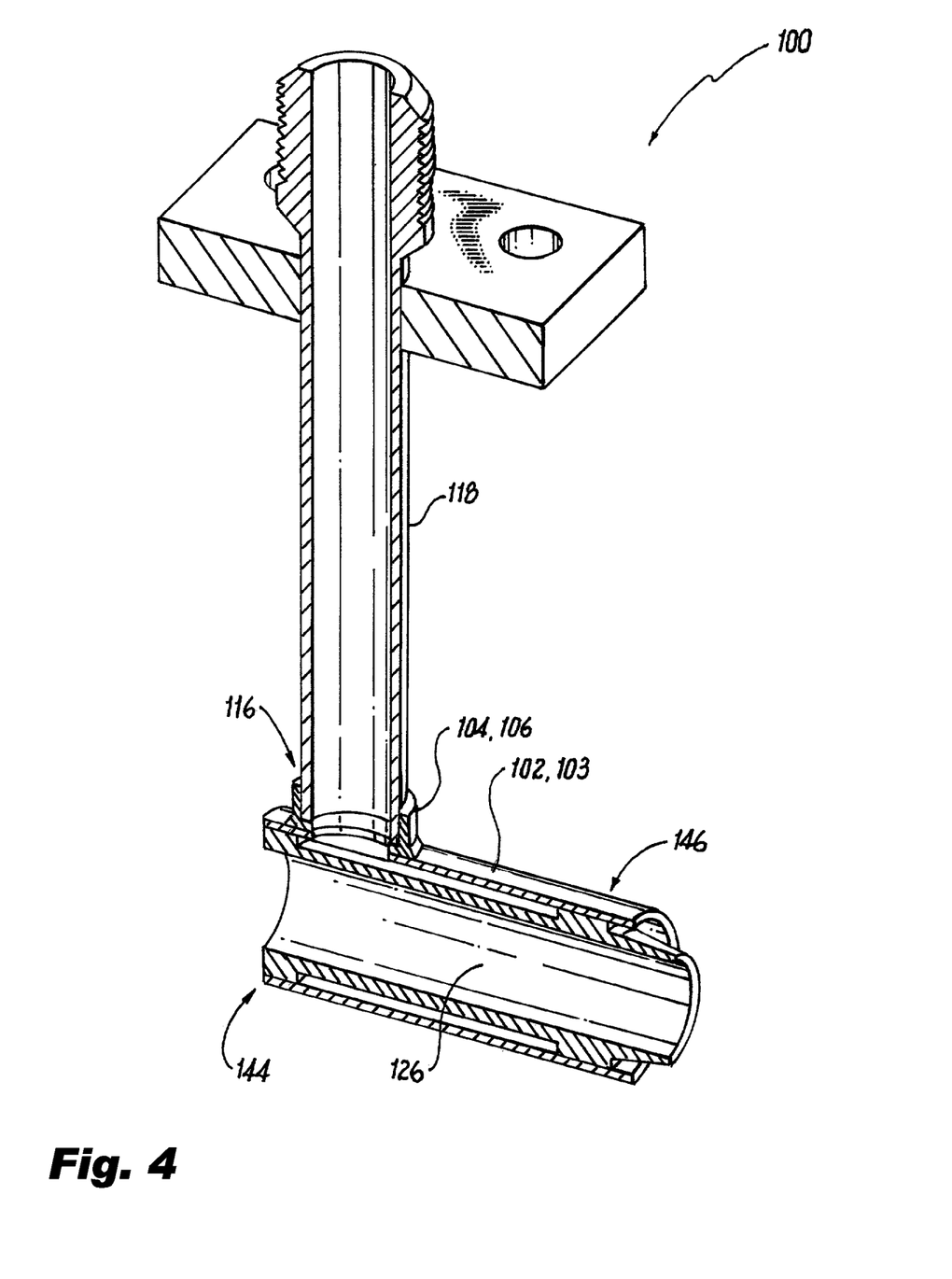

With reference now to FIG. 4, the method includes placing or flowing braze into a braze joint location 116 between the deposited material 104 and a feed arm 118 of the fluid injector 100. The braze joint is formed in the braze joint location 116 when the braze is cooled to join the feed arm 118 to the prefilmer 103. Those skilled in the art will readily appreciate that while it is shown in FIG. 4 as having the feed tube jointed to an inner surface of the added material 104, the feed arm could instead be fitted over and joined to an outward facing surface of the deposited material 104. Those skilled in the art will readily appreciate that any other suitable joining technique besides brazing can be used, such as welding.

Figure 5:
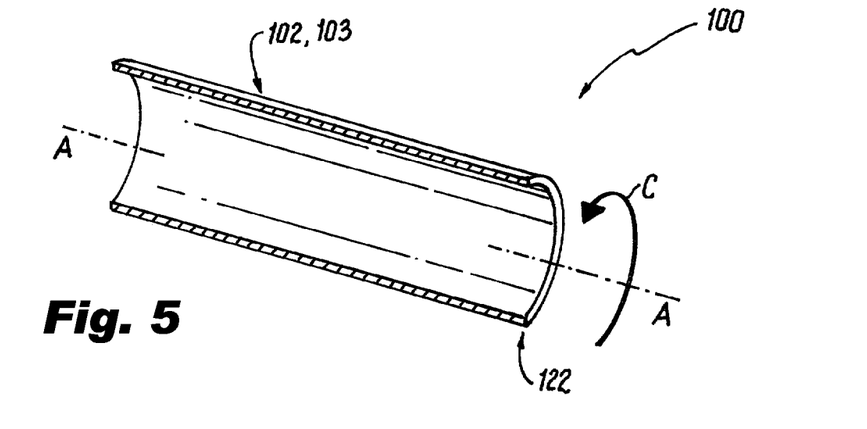
FIG. 5-7 are schematic cross-sectional perspective views of respective stages in a process in accordance with the present disclosure, showing deposition and machining of a structure for forming a prefilming surface on a prefilmer.
Figure 6:
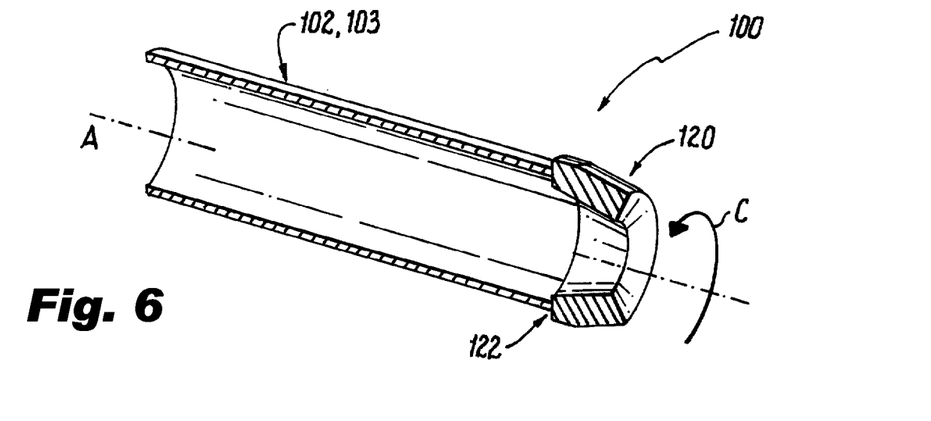
Figure 7:
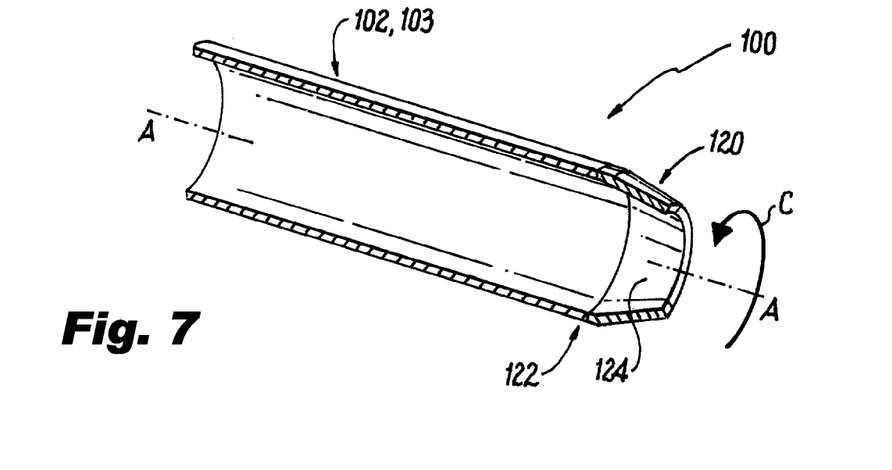

With reference now to FIGS. 5-7 starting from the piece of tube stock 102 of FIG. 5, a piece of tube stock 102 as shown in FIG. 5 can be formed into a prefilmer 103 as shown in FIG. 7. With reference to FIG. 6, the method includes depositing material 120 using laser cladding on an axial end 122 of the piece of tube stock around a full circumference C of the axial end 122, relative to the central axis A of the piece of tube stock 102. A frustoconical prefilming surface 124 is formed on an inside portion of the deposited material 120 by machining. The frustoconical prefilming surface 124 converges in a direction away from the piece of tube stock material 102 so that fluid such as liquid fuel, gas fuel, air, or the like flowing through the prefilmer 103 flows into the surface 124 and forms a converting film of fluid flow, e.g. for air blast atomization.

Figure 8:
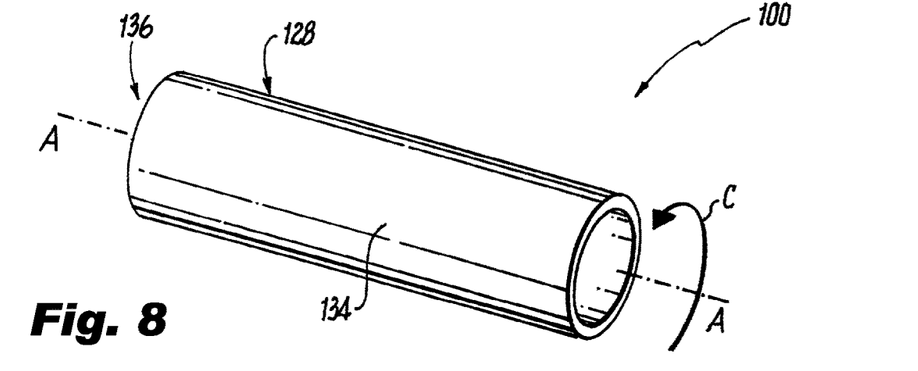
FIGS. 8-10 are schematic perspective views of respective stages in a process in accordance with the present disclosure, showing deposition and machining of fluid distributor features for a fluid injector.
Figure 9:
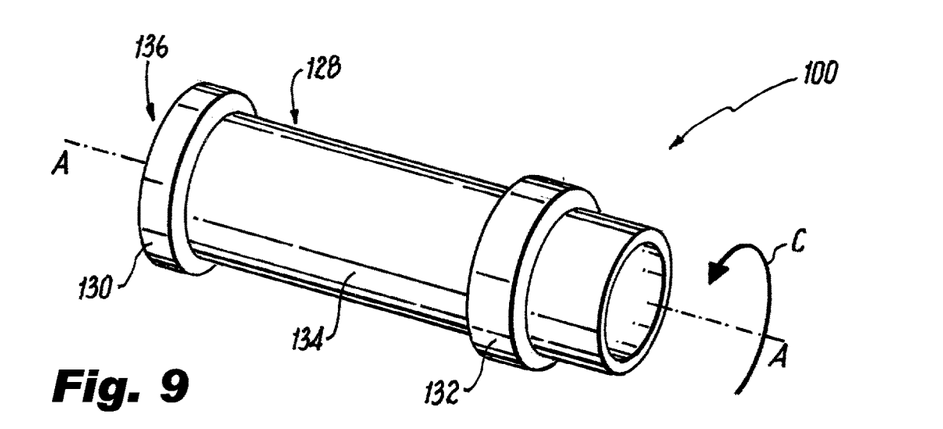
Figure 10:
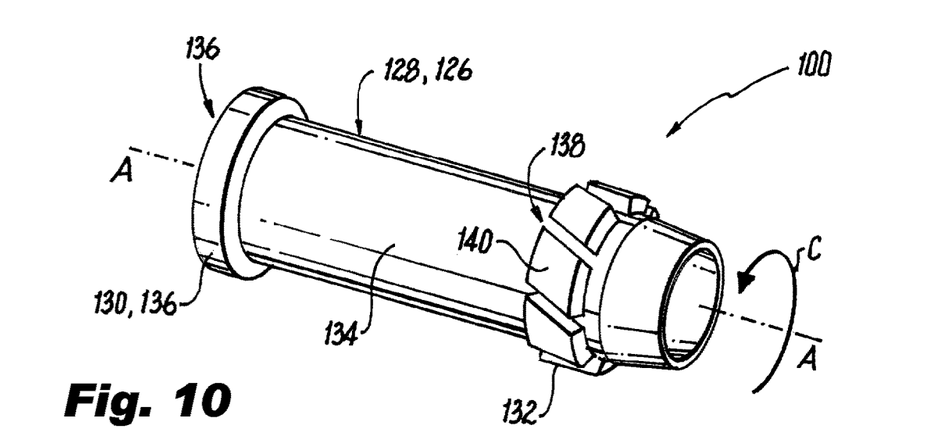

Referring now to FIGS. 8-10, a fluid distributor 126 as shown in FIG. 10 can be formed starting from a piece of tube stock 128 shown in FIG. 8. As shown in FIG. 9, two raised features 130, 132 of material are deposited by laser cladding about the full circumference of C of an outer surface 134 of the piece of tube stock 128. The method includes machining the deposited material of the first raised feature 130 to form a braze joint surface 136 on an outward facing aspect of the raised feature 130, as indicated in FIG. 10. As also shown in FIG. 10, machining includes forming fluid slots 138 in the raised feature 132, which can also optionally have its outer surface machine into a braze joint surface 140, or be machined to the final diameter needed for a tight press fit or interference fit to form a good sealing surface with a mating surface located outboard of the surface 140 (i.e. prefilmer 103 of FIG. 7).

The method includes placing or flowing braze into respective braze joint locations 144, 146 (identified in FIG. 4) between the braze joint surfaces 136, 140 and an inner surface 142 of a prefilmer 103 (labeled in FIGS. 1-3) and forming the braze into a braze joint in the braze joint locations 144, 146 to join the fluid distributor 126 to the prefilmer 103 as shown in FIG. 4.

Figure 11:
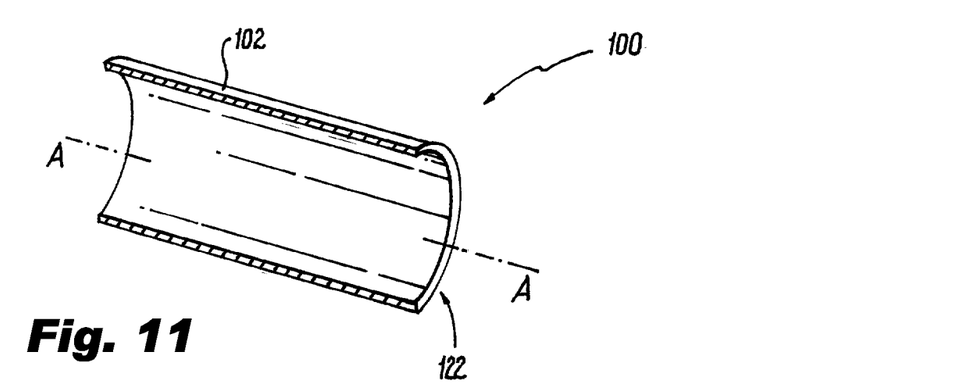
FIGS. 11-13 are schematic cross-sectional perspective views of respective stages in a process in accordance with the present disclosure, showing deposition and machining of an outer air swirler on a heat shield.
Figure 12:
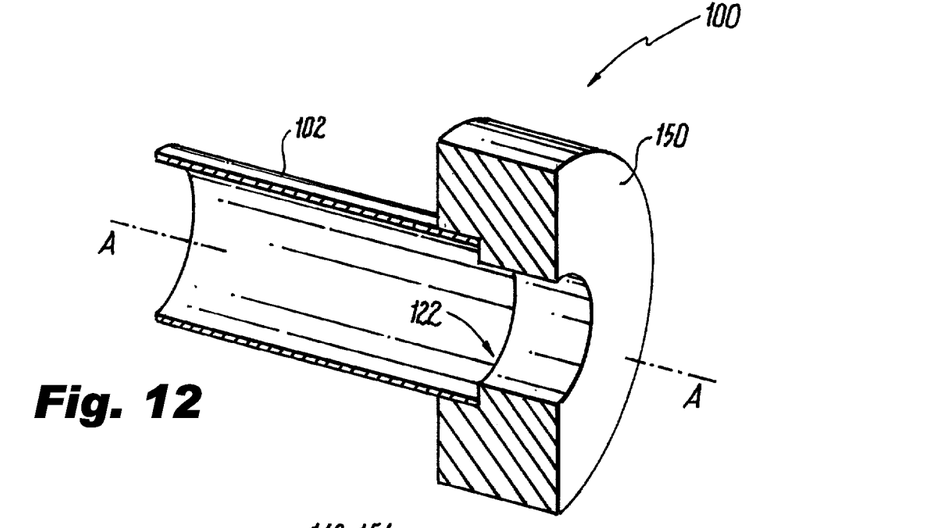
Figure 13:
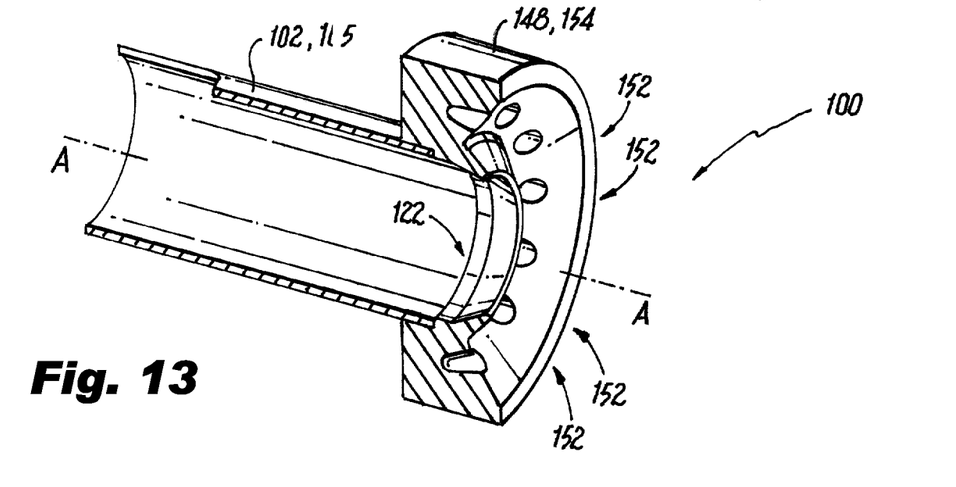
Figure 14:
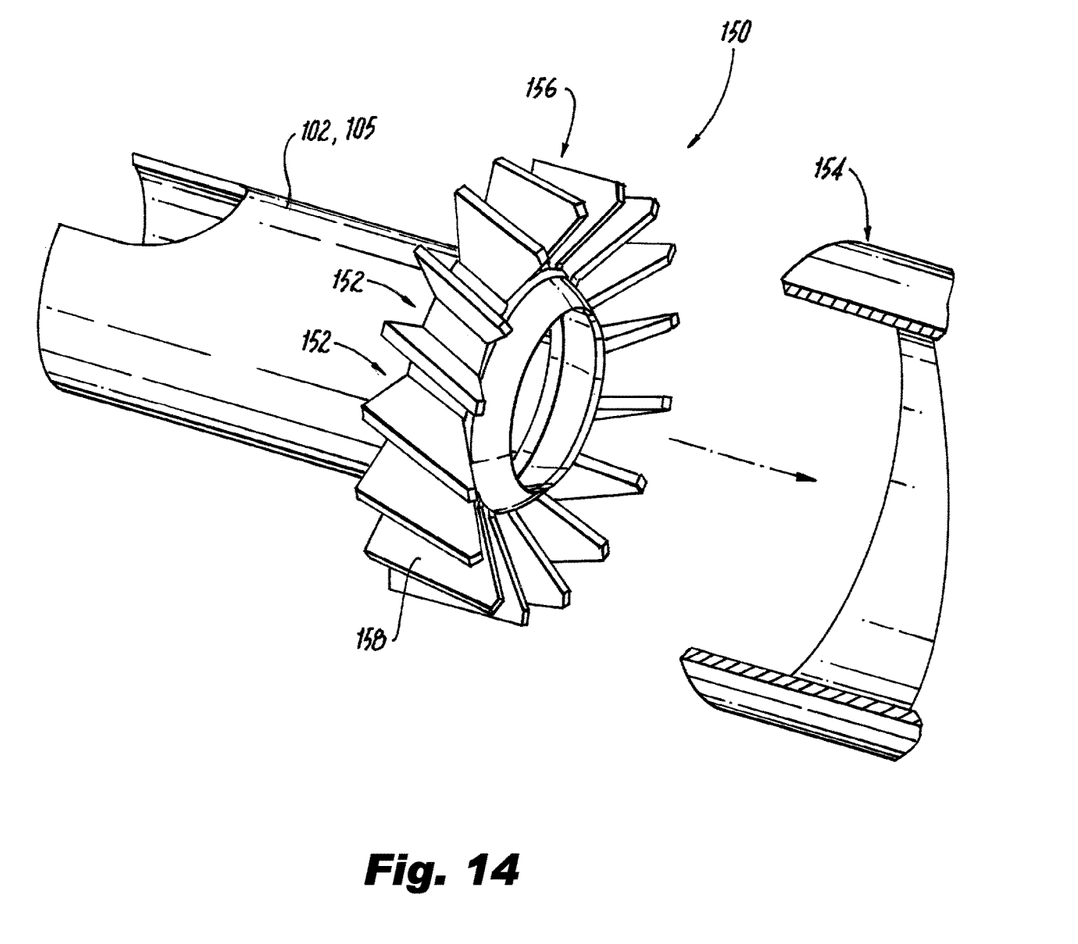
FIG. 14 is a schematic perspective view of another exemplary embodiment of an outer air swirler constructed in accordance with the present disclosure.

Referring now to FIGS. 11-13, starting from the piece of tube stock 102 shown in FIG. 11, an outer air swirler 148 can be formed on a heat shield 105 as shown in FIG. 13. As shown in FIG. 12, the first raised feature 150 is deposited at or proximate the axial end 122 of the piece of tube stock 102. Machining includes forming the deposited material of the raised feature 150 into an outer air swirler 148 as shown in FIG. 13. This can include forming air passages 152 through the deposited material 150. As shown in FIG. 13, an outer air cap 154 is machined outboard of air passages 152. However, as shown in FIG. 14, air passages 152 can be machined out of the deposited material, leaving vanes 158 between the air passages 152. Braze surfaces 156 are machined on the outward facing surfaces of vanes 158. An outer air cap 154 can be brazed to the braze surfaces 156.

Figures 15, 16:
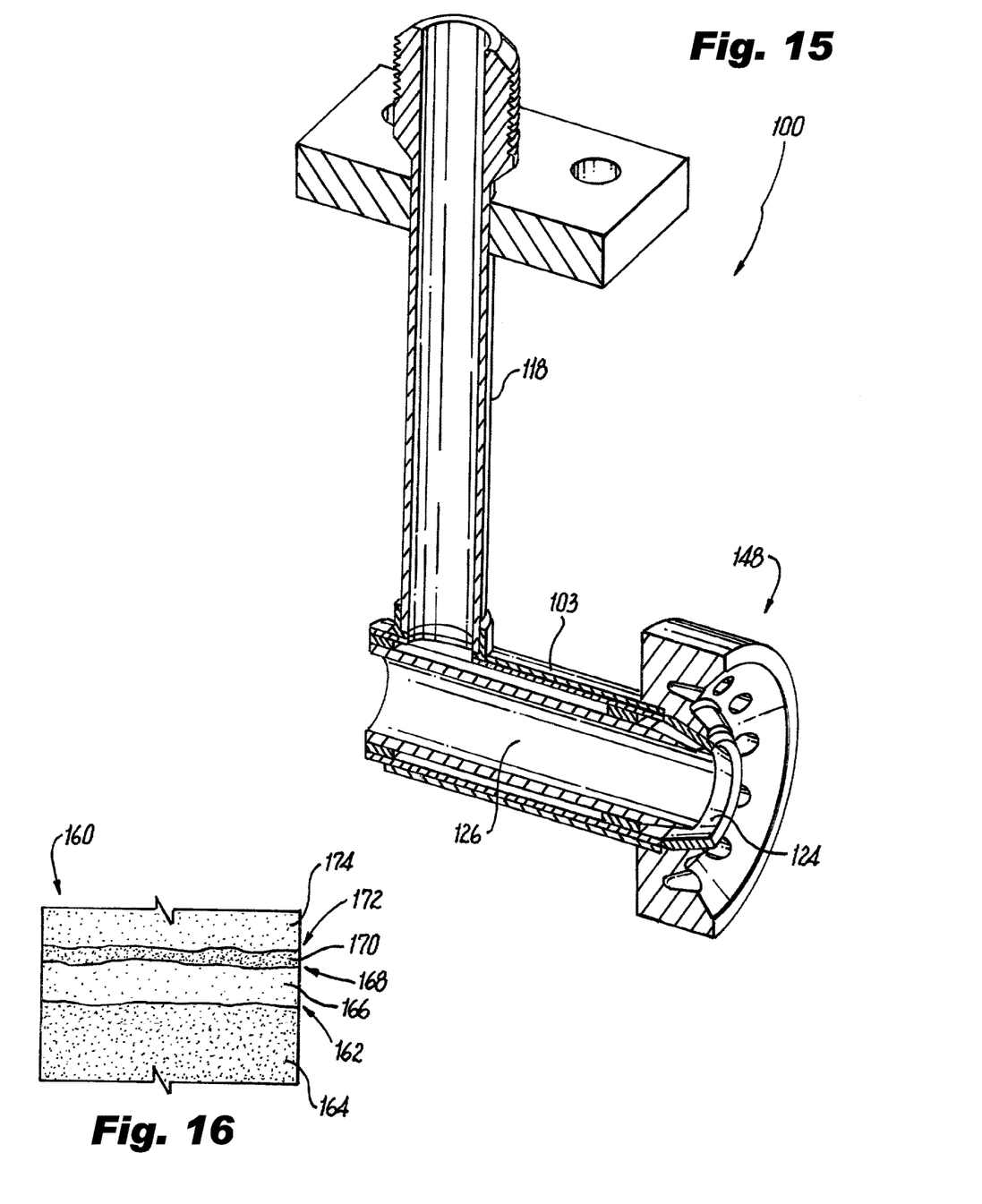
FIG. 15 is a schematic cross-sectional perspective view of a fluid injector constructed in accordance with the present disclosure.
FIG. 16 is a schematic cross-sectional view of a metallurgical joint in accordance with the present disclosure.

With reference now to FIG. 15, the fluid injector 100 includes a prefilmer 103 having an outer air swirler 148 (on the heat shield 105) and prefilming surface 124 formed thereon, with the feed arm 118 and fluid distributor 126 brazed in place as shown and described above. Those skilled in the art will readily appreciate that additional fluid injector components can be added to the fluid injector 100 of FIG. 15, such as heat shields, inlet fittings, strainers, inner air swirlers without departing from the scope of this disclosure.

With reference to FIG. 16, each braze joints are formed where the feed arm 118 is brazed to the prefilmer 103, where the fluid distributor 126 is brazed to the prefilmer 103, and optionally where an outer air cap 154 is brazed to vanes 158 as shown in FIG. 14, a metallurgical joint 160 is formed. The metallurgical crystal structure of the joint 160 includes a first crystal structure boundary 162 between the first fluid injector component 164 (e.g. prefilmer 103, fluid distributor 126, or vanes 158) and a laser clad material 166. A second crystal structure boundary 168 is between the laser clad material 166 and a braze material 170 (e.g. where one of the braze joints described above is located). A third crystal structure boundary 172 is between the braze material 170 and the second fluid injector component 174 (e.g. feed arm 118, prefilmer 103, or air cap 154). In cases where laser cladding is used to deposit material onto a fluid injector component, but where there is no component brazed to the deposited material, e.g. where the outer air swirler 148 is formed on the prefilmer 103 as shown in FIG. 13, there is no braze material, 170 or crystal structure boundaries 168, 172. Instead there is just the first fluid injector component 164, the crystal structure boundary 162, and the laser clad material 166.

Processes as disclosed herein allow for inexpensive tube materials to be used with more expensive materials such as high temperature materials for the air swirler side of the component, or very hard materials for the wear surfaces which interact with burner seals, for example. An additional potential advantage is that inexpensive material can be used for the tube body while specialized materials can be clad onto it. For example, a high temperature material can be used for the tip of the injector 100.

The methods and systems of the present disclosure, as described above and shown in the drawings, provide for construction of fluid injectors such as used in gas turbine engines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of making a fluid injector for a gas turbine engine comprising:

depositing material onto a piece of tube stock; and machining the deposited material into a fluid injector component;

wherein the piece of tube stock is a prefilmer, wherein depositing material includes depositing material on only a portion of a circumference of an outer surface of the piece of tube stock, and wherein machining includes forming a passage through the deposited material and through the piece of tube stock to form a passage through the deposited material and into an interior of the piece of tube stock, wherein the passage comprises a joint surface; and placing or flowing braze into a braze joint location comprising the joint surface, between the deposited material and a fluid injector feed arm and forming the braze into a braze joint in the braze joint location to join the feed arm to the prefilmer.

2. The method as recited in claim 1, wherein depositing includes laser cladding, electron beam cladding, cold spaying, and/or plasma spraying the material onto the piece of tube stock.

\* \* \* \* \*